United States Patent [19]
Lew

[11] Patent Number: 6,056,992
[45] Date of Patent: May 2, 2000

[54] ENCAPSULATED ADDITIVES

[75] Inventor: Chel W. Lew, San Antonio, Tex.

[73] Assignee: Campbell Soup Company, Camden, N.J.

[21] Appl. No.: 08/076,709

[22] Filed: Jun. 15, 1993

Related U.S. Application Data

[63] Continuation of application No. 07/534,496, Jun. 7, 1990, abandoned, which is a continuation-in-part of application No. 07/201,637, Jun. 2, 1988, abandoned.

[51] Int. Cl.[7] .................................................. A23L 1/237
[52] U.S. Cl. ............................ 426/649; 426/650; 426/96
[58] Field of Search ............................... 426/96, 650, 649

[56] References Cited

U.S. PATENT DOCUMENTS

| | | |
|---|---|---|
| 1,264,592 | 4/1918 | Atkinson . |
| 1,286,904 | 12/1918 | Atkinson . |
| 2,183,173 | 12/1939 | Segura . |
| 2,539,012 | 1/1951 | Diamond et al. . |
| 2,560,830 | 7/1951 | Turner . |
| 2,799,241 | 7/1957 | Wurster . |
| 2,819,971 | 1/1958 | Gunthardt . |
| 2,921,883 | 1/1960 | Reese et al. . |
| 2,956,926 | 10/1960 | Greif . |
| 2,970,911 | 2/1961 | Lorz . |
| 3,009,810 | 11/1961 | Raffensperger et al. . |
| 3,015,128 | 1/1962 | Somerville, Jr. . |
| 3,082,154 | 3/1963 | Allan . |
| 3,110,626 | 11/1963 | Larson et al. . |
| 3,131,068 | 4/1964 | Greif et al. . |
| 3,147,187 | 9/1964 | Playfair . |
| 3,159,874 | 12/1964 | Langer et al. . |
| 3,279,994 | 10/1966 | Koff . |
| 3,334,584 | 8/1967 | Sites . |
| 3,336,155 | 8/1967 | Rowe . |
| 3,341,466 | 9/1967 | Brynko et al. . |
| 3,455,838 | 7/1969 | Marotta et al. . |
| 3,471,304 | 10/1969 | Hamdy et al. . |
| 3,475,177 | 10/1969 | Jones . |
| 3,495,988 | 2/1970 | Balassa . |
| 3,523,906 | 8/1970 | Vrancken et al. . |
| 3,541,204 | 11/1970 | Sibbald et al. . |
| 3,641,236 | 2/1972 | Coppen et al. . |
| 3,663,271 | 5/1972 | Gerfely . |
| 3,712,867 | 1/1973 | Leverkusen et al. . |
| 3,726,805 | 4/1973 | Maekawa et al. . |
| 3,743,512 | 7/1973 | Hansen . |
| 3,767,421 | 10/1973 | Gulstad et al. . |
| 3,819,838 | 6/1974 | Smith et al. . |
| 3,856,699 | 12/1974 | Miyano et al. . |
| 3,867,556 | 2/1975 | Darragh et al. ........................ 426/98 |
| 3,876,809 | 4/1975 | Mussinan et al. . |
| 3,906,116 | 9/1975 | Quesnel et al. . |
| 3,922,379 | 11/1975 | Farhadieh . |
| 3,959,493 | 5/1976 | Baalsrud et al. . |
| 3,959,499 | 5/1976 | Harris et al. . |
| 3,962,416 | 6/1976 | Katzen . |
| 3,965,033 | 6/1976 | Matsukawa et al. . |
| 3,975,280 | 8/1976 | Hachmann et al. . |
| 3,985,913 | 10/1976 | Johnson et al. . |
| 4,001,480 | 1/1977 | Shank . |
| 4,045,587 | 8/1977 | Katz et al. . |
| 4,123,382 | 10/1978 | Morse et al. . |
| 4,141,998 | 2/1979 | Ziemke et al. . |
| 4,196,187 | 4/1980 | Dannelly et al. . |
| 4,211,668 | 7/1980 | Tate . |
| 4,217,370 | 8/1980 | Rawlings et al. . |
| 4,232,047 | 11/1980 | Sair et al. . |
| 4,259,355 | 3/1981 | Marmo et al. . |
| 4,267,198 | 5/1981 | Sato et al. . |
| 4,276,312 | 6/1981 | Merritt . |
| 4,288,460 | 9/1981 | Ciliberto et al. . |
| 4,333,919 | 6/1982 | Kleber et al. . |
| 4,351,825 | 9/1982 | Sothman et al. . |
| 4,384,975 | 5/1983 | Fong . |
| 4,386,106 | 5/1983 | Merritt et al. . |
| 4,409,257 | 10/1983 | Deline . |
| 4,460,563 | 7/1984 | Calanchi . |
| 4,497,845 | 2/1985 | Percel et al. . |
| 4,511,584 | 4/1985 | Percel et al. . |
| 4,515,769 | 5/1985 | Merritt et al. . |
| 4,537,784 | 8/1985 | Percel et al. . |
| 4,563,212 | 1/1986 | Becher et al. . |
| 4,595,584 | 6/1986 | Wu et al. . |
| 4,606,940 | 8/1986 | Frank et al. . |
| 4,608,277 | 8/1986 | Greiner et al. . |
| 4,640,709 | 2/1987 | Beestman . |
| 4,671,963 | 6/1987 | Germino et al. . |
| 4,673,595 | 6/1987 | Orsolini et al. . |
| 4,687,676 | 8/1987 | Wu et al. . |
| 4,695,463 | 9/1987 | Yang et al. . |
| 4,695,467 | 9/1987 | Uemura et al. . |
| 4,713,245 | 12/1987 | Ando et al. . |

(List continued on next page.)

FOREIGN PATENT DOCUMENTS

| | | |
|---|---|---|
| 968248 | 5/1975 | Canada . |
| 60-2173 | 1/1985 | Japan . |
| 936386 | 12/1959 | United Kingdom . |
| 972128 | 1/1961 | United Kingdom . |

OTHER PUBLICATIONS

Food Engineering, Ingredients—Vegetable oil encapsulates salt to overcome functional problems, May 1978, p. 57.

Graves, R.E., Cereal Science Today, Apr. 1972, vol. 17, No. 4, pp. 107–109.

Southwest Research Institute, "A Capability Statement for Microencapsulation".

Southwest Research Institute, "Microencapsulation".

J.M. Huber Corporation, "A New Synthetic Calcium Silicate for a Wide, 1987".

"Variety of Food Applications".

Dow Chemical, "Methocel Premium Food Gums".

Dow Chemical, "Thermal Gelation In Methocel Food Gums".

*Primary Examiner*—Carolyn Paden
*Attorney, Agent, or Firm*—Banner & Witcoff, Ltd.

[57] ABSTRACT

Edible microcapsules and a process for recovering them are disclosed. The microcapsules include a shell material that has a thermal gelation temperature within the range from about 90° F. to about 160° F. The encapsulated material is a food additive which is protected from degradation and loss during the processing at relatively high temperatures of food products. The invention is particularly useful for additives to liquid-based foods such as soups, stews, and sauces.

9 Claims, 3 Drawing Sheets

U.S. PATENT DOCUMENTS

| | | |
|---|---|---|
| 4,717,567 | 1/1988 | Wu et al. . |
| 4,740,376 | 4/1988 | Yang . |
| 4,749,575 | 6/1988 | Rotman . |
| 4,764,317 | 8/1988 | Anderson et al. . |
| 4,772,477 | 9/1988 | Weiss et al. . |
| 4,797,288 | 1/1989 | Sharma et al. . |
| 4,832,967 | 5/1989 | Autant et al. . |
| 4,837,004 | 6/1989 | Wu et al. . |
| 4,842,863 | 6/1989 | Nishimura et al. . |
| 4,876,097 | 10/1989 | Autant et al. . |
| 4,880,646 | 11/1989 | Lew et al. . |
| 4,971,804 | 11/1990 | Ghebre-Sellassie et al. . |
| 4,990,341 | 2/1991 | Goldie et al. . |
| 5,043,169 | 8/1991 | Cherukuri et al. . |
| 5,064,650 | 11/1991 | Lew . |
| 5,093,128 | 3/1992 | Draguesku et al. . |
| 5,132,125 | 7/1992 | Lew et al. . |
| 5,164,195 | 11/1992 | Lew . |
| 5,167,947 | 12/1992 | Geary . |
| 5,167,962 | 12/1992 | Lew et al. . |
| 5,190,775 | 3/1993 | Klose . |
| 5,246,636 | 9/1993 | Lew et al. . |
| 5,254,598 | 10/1993 | Schlameus et al. . |

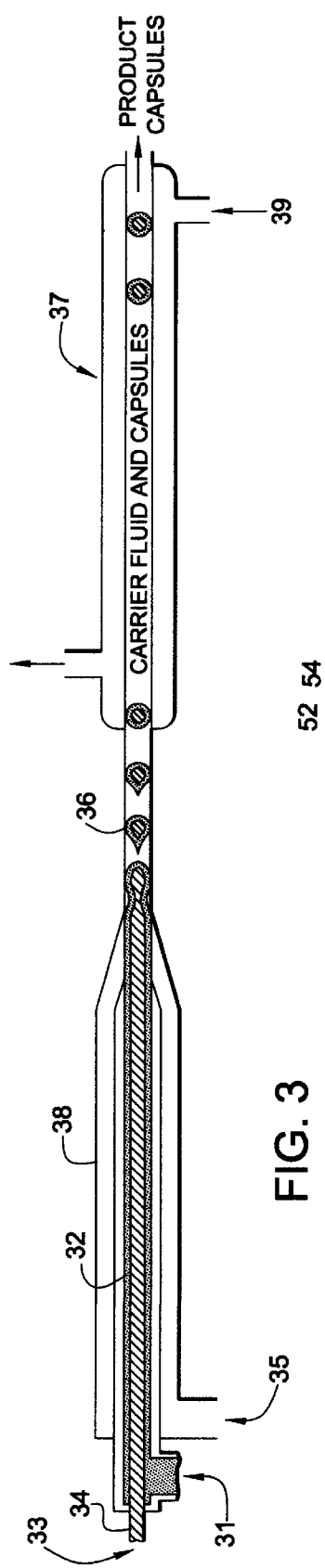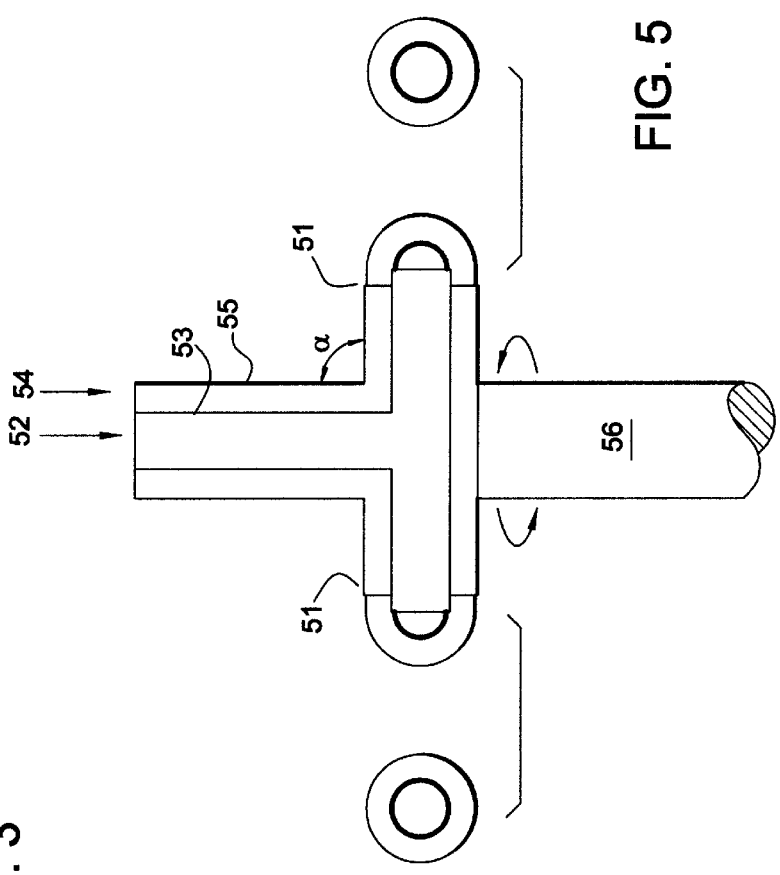

ENCAPSULATED ADDITIVES

The application is a continuation of U.S. Ser. No. 07/534,496, filed Jun. 7, 1990, now abandoned, which is a continuation-in-part of co-pending patent application U.S. Ser. No. 07/201,637, filed Jun. 2, 1988, now abandoned.

FIELD OF THE INVENTION

The invention relates to edible microcapsules containing additives, methods of making the edible microcapsules, and food products which contain them.

DESCRIPTION OF RELATED TECHNOLOGY

Food products universally contain various additives which enhance at least one characteristic of the food. Examples include volatile oils, water soluble spices, and viscosity-affecting agents. The aroma of the cooking food and the final flavor of the cooked food depend substantially on the existence and chemical form of these agents. Unfortunately, the severe processing conditions needed for the safe commercial distribution of many food products degrade or destroy many additives before the food is ultimately used by the consumer.

The problem of food additive losses is particularly acute in foods that have a water activity content of at least about 80%. Such water-based foods typically include soups, stews, and sauces. These products are usually cooked in large vats at about 140°–190° F., sealed into cans, and retorted at temperatures of at least about 250° F. for about 20 minutes to about an hour. These are exceptionally severe conditions for most food additives containing volatile oils, organic spices or both because the organic components are thermally degraded. Food additives also lose their effectiveness after only a few months of storage. The result of severe processing conditions and extended storage is a change in the flavor, aroma, odor, texture, and nutritional value of the food unless some action is taken to offset the losses.

The art has traditionally added excess levels of food additives to the food before processing to compensate for the expected losses. Alternatively, additives have been included with food products in the form of separate, discrete packages which must be mixed with the food product for consumption. High additive concentrations and separate packages, however, increase product costs and reduce the preparation convenience of the food.

Encapsulation is one method that is useful for protecting some types of additives in some foods. Encapsulated materials typically rely on a shell that is soluble in water or a shell that releases the encapsulated additive when crushed. Encapsulated materials, such as microcapsules, are to be distinguished from microspheres that exhibit a homogeneous structure and are typically formed by methods such as spray drying.

In U.S. Pat. No. 3,455,838, specific types of dextrins are used as a matrix to form a microsphere containing volatile oils for foods and cosmetics. The volatile oil is spray dried with the dextrin as an emulsion and becomes entrapped within a matrix of dextrin. The oil is released when the dextrin dissolves in water. U.S. Pat. No. 3,495,988 describes a similar process using a hydrophilic colloid (e.g., gelatin, casein, and soy protein). The bound material is blended in dry form with coffee powder and releases its active ingredient when the microspheres dissolve in water.

U.S. Pat. No. 3,712,867 describes coacervation as an encapsulation technique. One example uses a shell of acrylic acid and acrylamide. The encapsulated materials are described as including pharmaceuticals, plant protection agents, food additives, dyes, chemicals, lubricants, greases or oils, and adhesives. Due to the crosslinking possibilities with coacervates, the '867 patent suggests that it is possible to modify the water solubility of the shell so that the ingredients are released under certain conditions, e.g., upon immersion in water, under alkaline pH conditions, or with pressure (e.g., mechanical stressing or an increase in temperature).

Chewing gum is a popular product for encapsulated flavor additives. The additives are freed at body temperature by combinations of saliva, chemistry and physical crushing. U.S. Pat. Nos. 4,386,106; 4,515,769; 4,695,463; and 4,740,376 describe other encapsulated ingredients for chewing gums.

These prior encapsulation techniques, however, are not useful for water-based foods that include at least one high temperature processing step. Most encapsulating shells will not withstand the thigh processing temperatures or continue to provide protection to the additive over an extended storage period.

It would be desirable to have an encapsulated additive that could withstand food processing temperatures of at least about 200° F., protect the additive from degradation over an extended period of time at ambient storage conditions, and release the additive at an effective concentration level when the product is reheated for consumption.

SUMMARY OF THE INVENTION

It is an object of the invention to provide an encapsulated additive that enhances at least one characteristic of food product and which has a structure that protects the additive material through high processing temperatures and extended storage, but allow the additive to be released at an effective concentration when the food product is reheated for consumption.

In accordance with the object above and others that will become apparent from reading the description herein, the invention comprises an encapsulated food enhancing additive which comprises:

a core comprising: (a) at least one food enhancing additive; and (b) a meltable core material that is insoluble in water but which melts and releases said at least one additive in water at temperatures above about 90° F.; and an outer shell completely surrounding said core, said shell comprising a shell forming material that has a thermal gelation temperature within the range from about 90° F. to about 160° F.

The invention provides a practical means for protecting a wide variety of food additives through heat processing and extended storage. The invention further reduces the quantities of food enhancing additives which must be added to a commercial food product to achieve a desired concentration when the food is consumed.

BRIEF DESCRIPTION OF THE DRAWINGS

FIGS. 3 and 4 show the formation of microcapsules through submerged nozzles.

FIG. 5 is the formation of microcapsules through rotating extrusion nozzles that discharge into the air.

DETAILED DESCRIPTION OF THE INVENTION

Figures 1, 2:
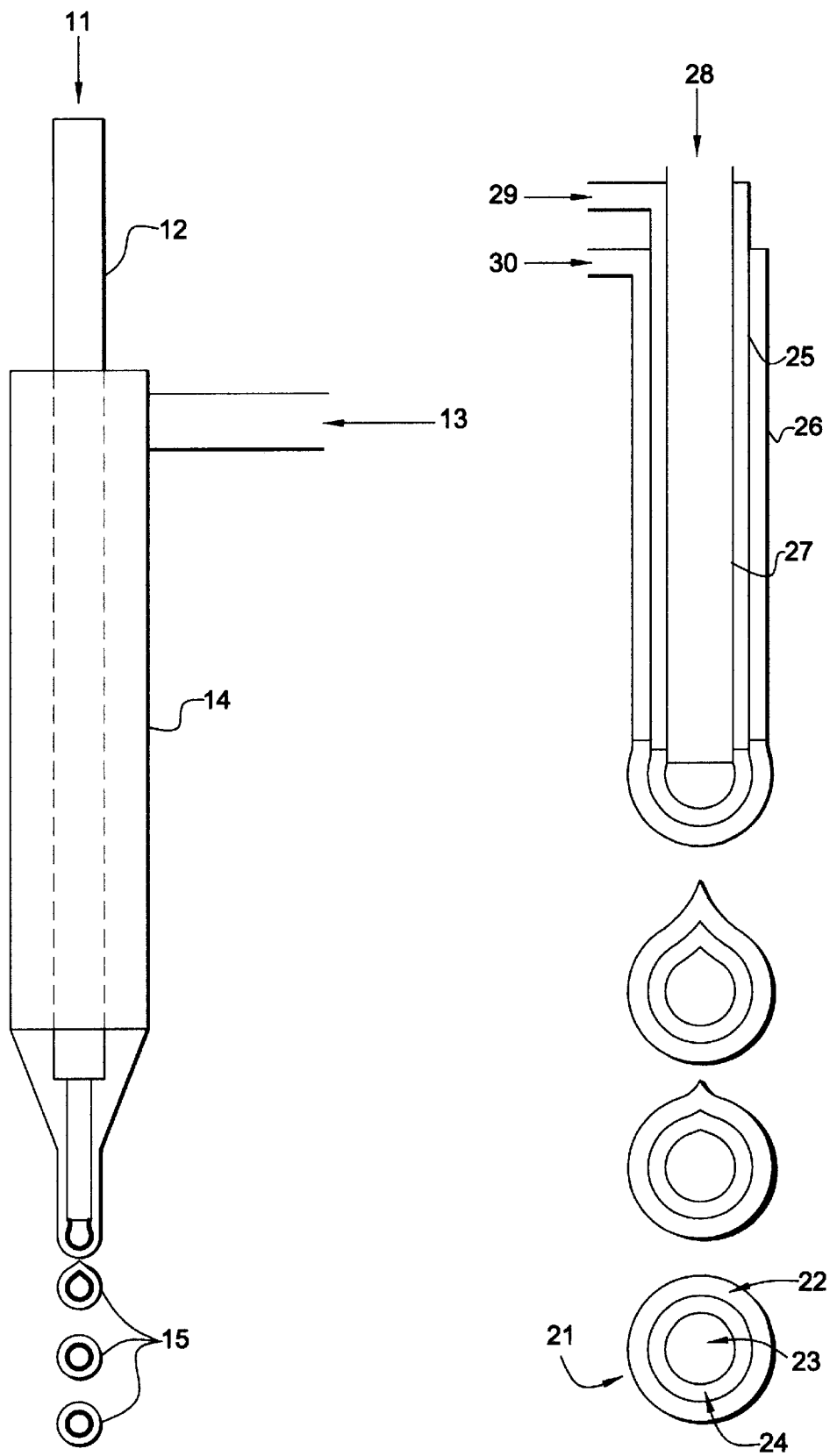
FIGS. 1 and 2 illustrate the formation of microcapsules through stationary nozzles.

Food enhancing additives according to the present invention can be added to virtually any comestible that is subjected to at least one high temperature processing step. Exemplary processing is heating to render the product commercially sterile. "Commercial sterility" of thermally processed food means the condition achieved by the application of heat which renders the food free of: (a) microorganisms capable of reproducing in the food under normal nonrefrigerated conditions of storage and distribution; and (b) viable microorganisms (including spores) of public health significance. Commercially sterile foods sealed in cans, jars, or pouches are beneficially affected by the present invention.

Particularly well suited are liquid-based comestibles such as sauces, stews, and soups which may contain, inter alia, vegetables, meats, and any of the many forms of pasta. Liquid-based foods are characterized by a water activity content of at least about 80% which is measured by comparing the food's vapor pressure to the vapor pressure of pure water when both liquids are at 20° C.

The term "food enhancing additive" is used broadly throughout the industry and in this application to denote any agent that affects the flavor (flavorant), aroma (odorant), viscosity, color (colorant), or nutritional value (e.g., a vitamin source) of a comestible. Examples of food additives in accordance with the invention include: food dyes, volatile and nonvolatile oils that add flavor and/or color, spices (e.g., salt and/or pepper), vitamins, and viscosity enhancing materials such as various forms of starch. The amount of food enhancing additive to be used for each type of food varies too widely to make meaningful any disclosure of a numerical range. The optimum quantity of any given additive will be determined by one in this art with no more than routine experimentation.

Canned soups are a preferred comestible for the invention, and the present invention may be conveniently described in that context. Soups are commercially prepared by the sequential steps of mixing, cooking at an elevated temperature, placing the soup into a can, sealing the can, and heating the canned food at an elevated temperature sufficient to render the soup commercially sterile. "Commercial sterility" of thermally processed food means the condition achieved by the application of heat which renders the food free of: (a) microorganisms capable of reproducing in the food under normal nonrefrigerated conditions of storage and distribution; and (b) viable microorganism (including spores) of public health significance. Suitable heat generating means include, inter alia, ovens, autoclaves, steam tunnels, and microwave chambers.

The typical cooking temperature of soup is about 140°–19° F. Suitable thermal processing includes retorting at superatmospheric conditions at temperatures of at least about 250° F. Thereafter, the food product is allowed to cool to ambient temperature, boxed, and stored at temperatures ranging from 35°–100° F. Canned soups are typically reheated to a temperature of about 140°–212° F. for consumption. The present invention uses these temperature changes and a microencapsulated food enhancing additive to provide a means by which soup additives can be added before the heat processing, protected during the relatively high treatment temperatures, and yet become available upon reheating for consumption.

Microencapsulation avoids the additive losses associated with reaction and degradation during storage. Microencapsulation also eliminates the practice of adding excess amounts of additives to compensate for storage losses.

Microcapsules according to the invention have an outer shell with a thermal gelation temperature within the range from about 90° F. (about 30° C.) to about 160° F. (about 72° C.) around a core that is microcapsule or a microsphere containing the food enhancing additive. Suitable outer shell materials include edible polymers and/or edible colloids. Particularly preferred shell materials that exhibit the desired thermal gelation temperatures are cellulose and cellulose derivative polymers such as methylcellulose, hydroxypropylcellulose, hydroxypropylmethylcellulose, and mixtures thereof. The outer shell should have a thickness sufficient to ensure coverage of the entire core surface area. Suitable thicknesses are greater than about $3\mu$ thick, preferably about $3\mu$ to about $50\mu$, and even more preferably about $10$–$20\mu$ in thickness. These shell thicknesses will typically result in an outer shell weight of at least about 5 wt % of the entire microcapsule weight. The thickness and corresponding weight percentage of the shell may be increased to provide additional protection against rupture during any agitation steps that may be used in the food processing sequence.

The thermal gelation temperature of the outer shell material is the temperature at which the shell polymers start to lose their water of hydration and become insoluble in water. The start of gelation is manifested by an increase in solution viscosity and is readily determined by conventional viscosity measurements. The solution viscosity continues to increase as the solution is held at a temperature above the material gelation temperature.

Certain additives can be added to the outer shell material to affect its gelation temperature and tailor the release of the food enhancing additive to the thermal handling sequence of the food product. For example, shell additives such as sorbitol and glycerine can depress the gelation temperature by about 10° F. to about 36° F., but other shell additives such as ethanol and propylene can increase the gelation temperature by up to about 45° F. Sucrose is one shell additive that can be used to either depress or elevate the gelation temperature depending on the amount used. Adding relatively low amount, about 5 wt %, can elevate the gelation temperature up to about 10° F. yet relatively larger amounts, about 20 wt %, can depress the gelation temperature by up to about 45° F. Table 1 lists the gelation temperatures for various cellulose polymers with various shell additives.

TABLE 1

| Additive | wt % | Methocel ® A15C | Gelation Temperature (F.) Methocel ® F15C | Methocel ® K4M |
| --- | --- | --- | --- | --- |
| none |  | 122 | 145 | 185 |
| MgCl$_2$ | 5 | 107 | 125 | 153 |
| Sucrose | 5 | 124 | 151 | 183 |
| Sucrose | 20 | 111 | 138 | 142 |
| Sorbitol | 20 | 86 | 115 | 118 |
| Glycerine | 20 | 93 | 140 | 149–158 |
| Ethanol | 20 | 167 | 167 | 167 |
| Propylene | 20 | 138 | 176 | 176 |

Methocel ® A15C is a methylcellulose gum at 1500 cP viscosity
Methocel ® F15C is a hydroxypropylmethylcellulose gum at 1500 cP viscosity
Methocel ® K4M is a hydroxypropylmethylcellulose gum at 4000 cP viscosity The microencapsulated additives of the invention are added to the soup when the soup is at a temperature above the outer shell gelation temperature but before the soup is thermally processed to achieve commercial sterility. The outer shell protects the food enhancing additive from the heat of the initial cooking and subsequent retortion by staying intact and not dissolving.

The gelation mechanism is, however, reversible. As the surrounding liquid cools to below the gelation temperature, the polymers become rehydrated and water soluble. For soup processing, this property means an encapsulated additive can be mixed with the soup before thermal processing and, when properly handled, can remain protected from volatilization or chemical reaction until the soup cools. Upon cooling, the outer shell dissolves and releases the food enhancing additive from the core into the soup.

The core structure should be designed to protect the food enhancing additive during the period between dissolution of the outer shell and heating the food for consumption. This storage period can, however, vary from several days to a year or more depending on the food product. Fortunately, the microcapsule core structure containing the food enhancing additive can be designed in accordance with the invention to accommodate short or extended storage periods.

The food enhancing additive is present in the core either as microsphere that is insoluble in water at the storage temperatures expected to be encountered during storage or in a core microcapsule having its own shell that is insoluble in water at the relatively cool temperatures of storage. If the core is a microsphere, the food enhancing additive is homogeneously distributed in a core matrix material that melts or otherwise dissolves when the food product is heated to an elevated temperature. Preferred core matrix materials are solid at temperatures of up to about 120° F. although the specific material chosen for use in the core should be selected so that the food enhancing additive is not released into the food before it is needed in the food cooking process.

Specific materials contemplated for use in the core include:

(1) fats that are normally solid at about 70° F., such as partially hydrogenated soybean oil, cottonseed oil, palm oil, and mixtures thereof alone or in combination with any of the mono-, di-, and triglycerides having about 14–20 carbon atoms;

(2) edible waxes, such as fully refined paraffin wax;

(3) surfactants, such as monoglycerides and lecithins; and (4) mixtures of these materials.

The meltable microsphere core may be conveniently formed into a matrix by conventional spray drying techniques which include: (a) homogeneously mixing the core matrix material with the additive; and (b) forming droplets from the mixture. The additive and matrix may be mixed by conventional high shear mixing or emulsion forming techniques with or without emulsifiers.

The core may also be mixed with one or more materials that increases its hydrophobic properties. Exemplary hydrophobic materials include the food grade, alkaline earth stearates (e.g. calcium or magnesium stearate) and silicon dioxide in quantities of up to about 10 wt %, preferably about 4 to about 6 wt % depending on the cellulosic material used. Stearic acid may enhance precipitation if the cellulose shell has a gelation temperature between about 120° F. to about 160° F.

Another useful core structure is when the core is a microcapsule having at least one discrete shell completely surrounding a nucleus particle or core microsphere of at least one food enhancing additive. The microcapsule core shell can be made of the same material that would be used for a meltable microsphere core, i.e. hard fats, edible waxes, surfactants, and mixtures thereof. Combinations of meltable layers each containing a different food enhancing additive can be used for foods having the additives released at different times in the heating process, i.e., at different temperatures during the heating period.

The shell of a microencapsulated core is desirably greater than about $20\mu$ in thickness, preferably about $20-35\mu$, and even more preferably about $20-30\mu$ in thickness. Like the outer shell, any core layers should cover the entire surface area of the underlying material to prevent premature release of the encapsulated material.

The core containing the additive in the form of a microsphere can be encapsulated with the core shell by any of the conventional mechanical or chemical techniques used to form the outer shell around the core. Preferably, successive layers are formed substantially simultaneously such as by coextrusion through annular nozzles. Linear spacing of the nozzles can be used to stagger, with small time increments, the encapsulation of the core and the encapsulation of the microcapsule core. See, FIG. 2.

The final microencapsulated food enhancing additive, regardless of core structure, may be used in a variety of sizes. The preferred sizes are within the range of about 100 to about 7,000 microns in diameter and most preferably about 900–1500 microns. The microcapsule desirably has about 30–50 wt % food enhancing additive.

As a general guideline, it is desirable to use the largest numbers of microcapsules and a reasonably low additive concentration per capsule. This practice is designed to minimize the product quality variations that might occur if a few microcapsules were not dispensed into the product due to dispensing method variations.

The microencapsulated food enhancing additives may also be made by a variety of other conventional mechanical and chemical droplet forming techniques. The preferred techniques are, however, mechanical in nature such as extrusion through stationary (FIGS. 1 and 2), submerged (FIGS. 3 and 4), or rotating extrusion nozzles (FIG. 5). Extrusion through rotating nozzles is the preferred method. Such extrusion devices are characterized by two or more concentric tubes which terminate in concentric orifices. The material from the outer nozzle(s) will surround the material from the inner nozzle(s) and form microcapsules. Additional annular tubes can be added to form additional layers as desired. Preferably, two or three concentric tubes are used to form the most preferred microcapsules of the invention. The outer shell material will pass through the outermost annular tube and surround the core microsphere or microcapsule containing the food enhancing additive.

FIG. 1 illustrates a conventional, stationary extrusion device with a central and an annular nozzle. This apparatus can be used to form a shell surrounding a microsphere core. Core material 11 containing food enhancing additive and meltable core matrix passes through central tube 12 and meets outer shell material 13 passing through outer annular tube 14. At the nozzle ends, outer shell material 13 surrounds core material 11 to form microcapsules 15. Microcapsules 15 are then collected and/or hardened by, inter alia, chemical reaction, cooling, drying, screening, centrifugation, and other equivalent techniques.

FIG. 2 illustrates a device having three extrusion tubes for encapsulating a microcapsule core containing the food enhancing additive. Microcapsule 21 exhibits outer shell 22, inner shell 23, and core 24. Core 24 may be a solid nucleus of food enhancing additive, a microsphere, or a liquid food enhancing additive. The parallel paths of the shell and core materials is similar to FIG. 1 except for the additional use of a middle annular tube 25 between outer annular tube 26 and central tube 27. Core material 28 passes through central tube 27, inner shell material 29 passes through middle annular tube 25, and outer shell material 30 passes through central tube 27.

FIG. 3 depicts a submerged extrusion nozzle. The depicted nozzle has three tubes like FIG. 2, but outer shell material 31 is passed through middle tube 32 and core material 33 is passed through central tube 34. Carrier fluid 35 moves through outer tube 38 at a sufficient flowrate to carry microcapsules 36 to the hardening zone 37. Carrier fluid 35 conveniently contains any chemical reactants, hardening agents, or immiscible liquids that will cause microcapsules 36 to form and/or harden quickly. Heating medium 39 flows through hardening zone 37 to cause outer shell material 31 to harden around core material 33.

Preferred carrier fluids 35 contain common salt (NaCl) in concentration of at least about 10 wt %, preferably at least about 12 wt %, and most preferably at least about 15 wt % salt based on the total weight. Salt is particularly useful for producing a hard microcapsule when using outer shell materials that are sensitive to salt.

Salt solutions are a desirable medium in which to form the microcapsules because it has been determined that the resulting microcapsules do not become tacky or have a tendency to clump together after they are removed from the formation solution. Such a medium is also compatible with a microcapsule which comprises an inner material of fat and salt around which is formed the encapsulating outer shell. The high temperature relatively for the concentrated salt solution ensures that the encapsulating shell will not dissolve in water.

Figure 4:
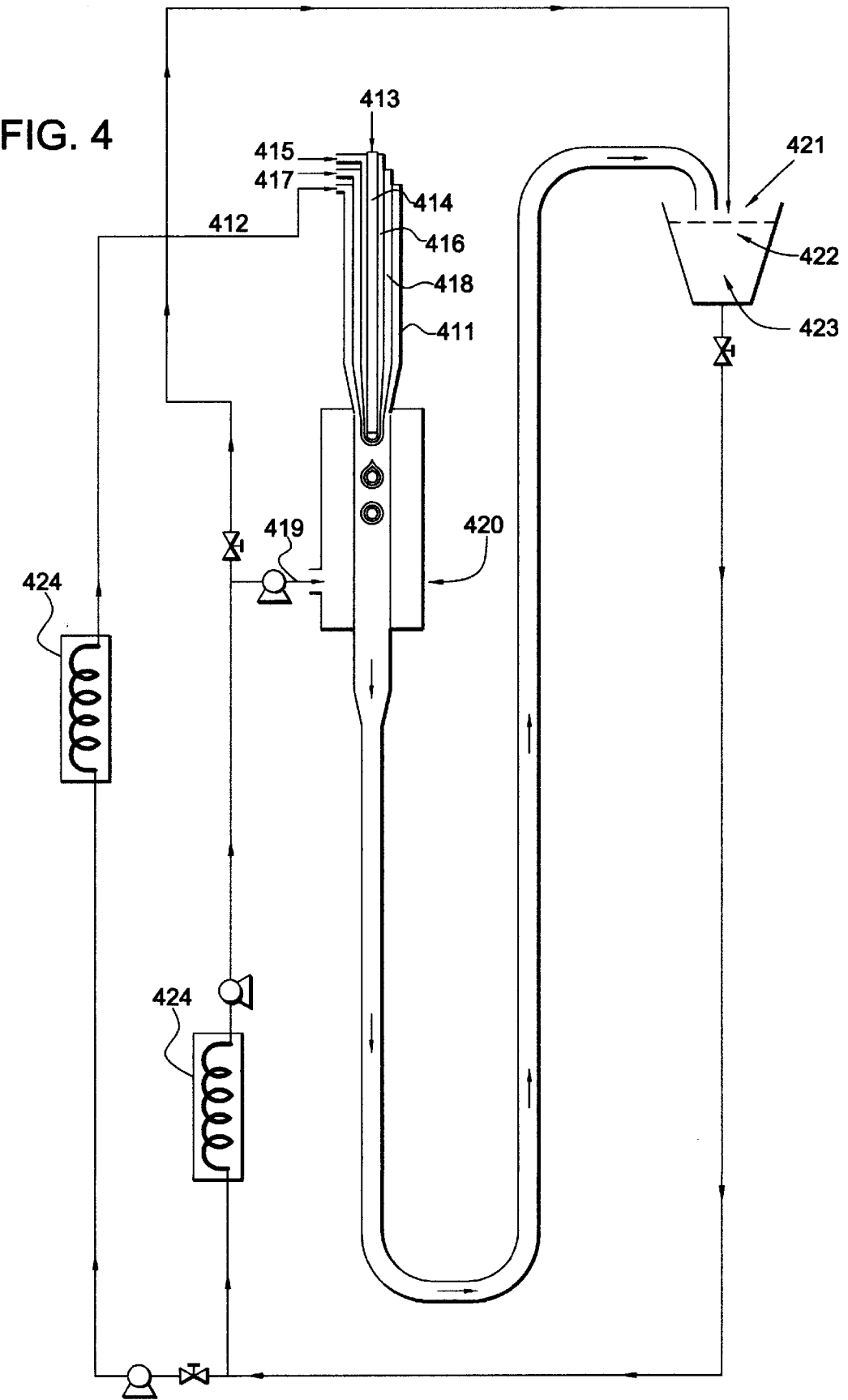

FIG. 4 depicts a submerged extrusion system where the three tube extruder of FIG. 2 is modified to encapsulate microcapsule cores. Core material 413 passes through central tube 414. Core shell material 415 passes through first annular tube 416. Outer shell material 417 passes through second annular tube 418. The revised extruder includes a fourth annular tube 411 for carrier fluid 412. Carrier fluid 412 can include hardening additives as described above. Additional carrier fluid 419 is pumped into transport zone 420 for passage to recovery zone 421 which comprises screen 422 over tank 423.

Heater/chiller units 424 are used to control the temperature of carrier fluid 412 and 419. Carrier fluids 412 and 419 are desirably maintained at a temperature above the thermal gelation temperature of the outer shell material, e.g. above about 90° F. As with the embodiment of FIG. 3, carrier fluids 412 and 419 can contain appropriate salts (e.g., sodium chloride) in amounts sufficient to encourage the outer shell to harden.

FIG. 5 illustrates a set of rotating extrusion nozzles 51 that rotate on a horizontal plane at a rate of about 100 to several thousand rpm and form encapsulated microspheres. The basic construction details are similar to stationary nozzle 1 in that core material 52 is passed through the central tube 53 while outer shell material 54 passes through annular tube 55. Central tube 53 and annular tube 55, however, bend at an angle α of about 60–120° from vertical, preferably about 90°, to produce a centrifugal force on the microcapsule materials. The degree of that force and the size of the resulting microcapsule can be controlled by adjusting the rotation rate of drive shaft 56. For example, a core of an edible fat and a shell of a cellulosic material will form microcapsules having a diameter of about 1 mm with an orifice size of about 0.020–0.040 inches and a rotation rate of about 500 rpm.

The extruded microspheres from rotating nozzles 51 are desirably released from the extruder into free fall for sphere formation and then collected in a salt-containing bath. The bath preferably contains at least about 10 wt %, preferably at least about 12 wt %, and most preferably about 15 wt % salt based on the total weight. Like the submerged system above, salt is particularly useful for producing a hard microcapsule when using outer shell materials that are sensitive to salt.

Surfactants may be used in the salt collection bath to reduce the interfacial tension of the bath and the flattening forces encountered upon impact of the particle with the liquid surface. Appropriate concentrations are readily determinable with no more than routine tests.

Other chemical microcapsule manufacturing techniques that can be used to form microencapsulated food enhancing additives according to the invention include coacervation and phase separation. A description of these techniques can be found in U.S. Pat. Nos. 3,712,867 (coacervation) and 4,211,668 (emulsion) which are herein incorporated by reference.

The present invention is conveniently described with reference to the following examples.

EXAMPLES

Flavoring agents containing a small amount of trans-2-hexanal and hexanal as tracer material were formed into a microsphere with a partially hydrogenated vegetable oil as a hard fat. The microsphere core was then encapsulated in a cellulosic shell by extrusion through rotating nozzles. The microcapsules were sized to be no larger than 1 mm in diameter and collected in a 15% salt solution. The salt solution was at a temperature of 170°–180° F.

The microencapsulated additives were added to soup when the soup had a temperature of about 160° F. The soup containing the microencapsulated additive were then heated in a retort at about 250° F. for 30–60 minutes to achieve commercial sterility.

| Example | Shell Composition (wt %, dry basis) | Fill Composition (wt %) |
| --- | --- | --- |
| 1 | 83% Methocel ® E-3<br>17% sorbitol | 100% flavor mix in cottonseed oil |
| 2 | 99.9% Methocel ® E-3<br>0.1% Tandem ® 552 | 70% Durkee ® KLX<br>30% flavor mix |
| 3 | 83% Methocel ® E-3<br>17% sorbitol<br>0.1% Tandem ® 552 | 70% Durkee ® KLX<br>30% flavor mix |

*Durkee KLX is a partially hydrogenated vegetable oil
*Methocel ® E-3 is a hydroxypropylmethylcellulose.
*Tandem ® 552 is a food grade emulsifier blend of mono- and di-glycerides, polysorbate 60, water, BHA, and citric acid.

The soup was measured weekly for two months and biweekly for four months thereafter for the release of trans-2-hexanal and hexanal. The presence of these agents indicates the release of the encapsulated materials and breakdown of the core structure. The encapsulated flavoring agents showed good stability and resistance to degradation over extended storage periods of 50 days.

The examples are set forth for purposes of illustration only and are not intended to be construed as limitations on the scope of the appended claims.

What is claimed is:

1. A method for making edible microcapsules, said method comprising:
   forming an edible microcapsule having:
   a) a core comprising: (i) at least one food enhancing additive; and (ii) a meltable core material that is insoluble in water but which melts and releases said at least one additive in water at temperatures above about 90° F.; and b) an outer shell completely surrounding said core, said outer shell comprising a shell forming material that has a thermal gelation temperature within the range from about 90° F. to about 160° F.;

collecting the microcapsule in an aqueous solution at a temperature greater than about 140° F. containing at least about 10 wt % sodium chloride.

2. The method according to claim 1 wherein said aqueous solution comprises at least about 12 wt % sodium chloride.

3. The method according to claim 2 wherein said aqueous solution comprises at least about 15 wt % sodium chloride.

4. The method according to claim 2 wherein the forming step comprises surrounding said food additive with a shell material selected from the group consisting of hydroxymethylcellulose and methylcellulose.

5. A method according to claim 1 wherein said at least one food enhancing additive comprises a spice.

6. A method according to claim 5 wherein said at least one food enhancing additive comprises a spice.

7. A process for preparing a liquid-based food product, said process comprising:

adding to a liquid-based food product a microencapsulated food enhancing additive comprising:

a) a core comprising: (i) at least one food enhancing additive; and (ii) a meltable core material that is insoluble in water but which melts and releases said at least one additive in water at temperatures above about 90° F.; and b) an outer shell completely surrounding said core, said outer shell comprising a shell forming material that has a thermal gelation temperature within the range from about 90° F. to about 160° F.; and heating said food product containing said additive at an elevated temperature for a time sufficient to render said food product commercially sterile; and allowing the commercially sterile food product to cool so said outer shell dissolves and releases said core into the food product.

8. The process according to claim 7 further comprising:

heating the food product containing the released core at an elevated temperature and for a time sufficient to release said food enhancing additive from said core.

9. A method for making edible microcapsules, said method comprising:

forming an edible microcapsule having:

a) a core comprising: (i) at least one food enhancing additive; and (ii) a meltable core material that is insoluble in water but which melts and releases said at least one additive in water at temperatures above about 90° F.; and b) an outer shell completely surrounding said core, said outer shell comprising methylcellulose.

* * * * *

UNITED STATES PATENT AND TRADEMARK OFFICE
CERTIFICATE OF CORRECTION

PATENT NO.: 6,056,992
DATED: May 2, 2000
INVENTOR: Chel W. Lew

It is certified that an error appears in the above-identified patent and that said Letters Patent is hereby corrected as shown below:

In Claim 9, column 10, line 26, the period has been replaced with a semicolon;

> line 27, insert --collecting the microcapsule in an aqueous solution at a temperature greater than about 140° F containing at least about 10 wt% sodium chloride.--.

Signed and Sealed this

Twenty-fourth Day of April, 2001

*Attest:*

NICHOLAS P. GODICI

*Attesting Officer*   Acting Director of the United States Patent and Trademark Office